United States Patent Office 3,529,071
Patented Sept. 15, 1970

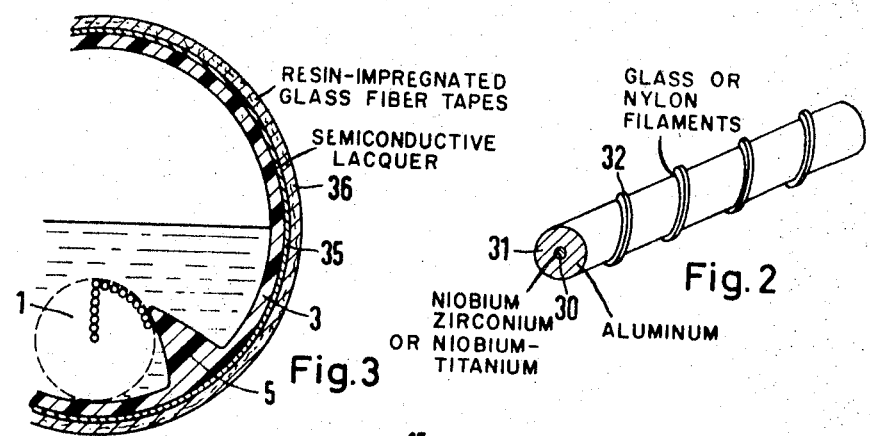
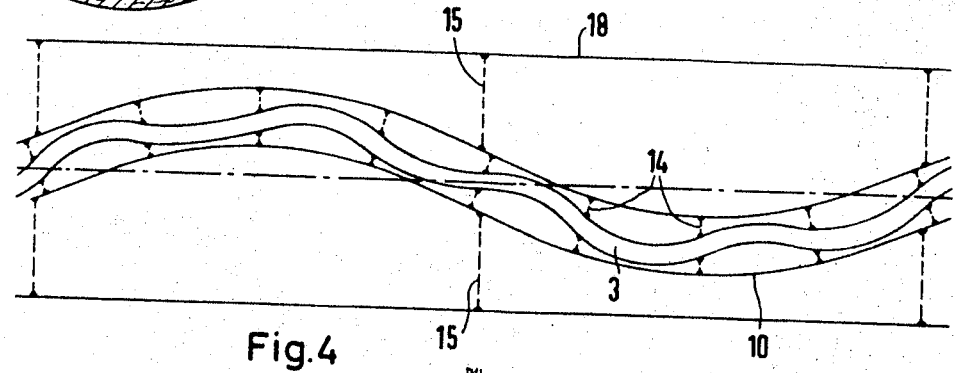
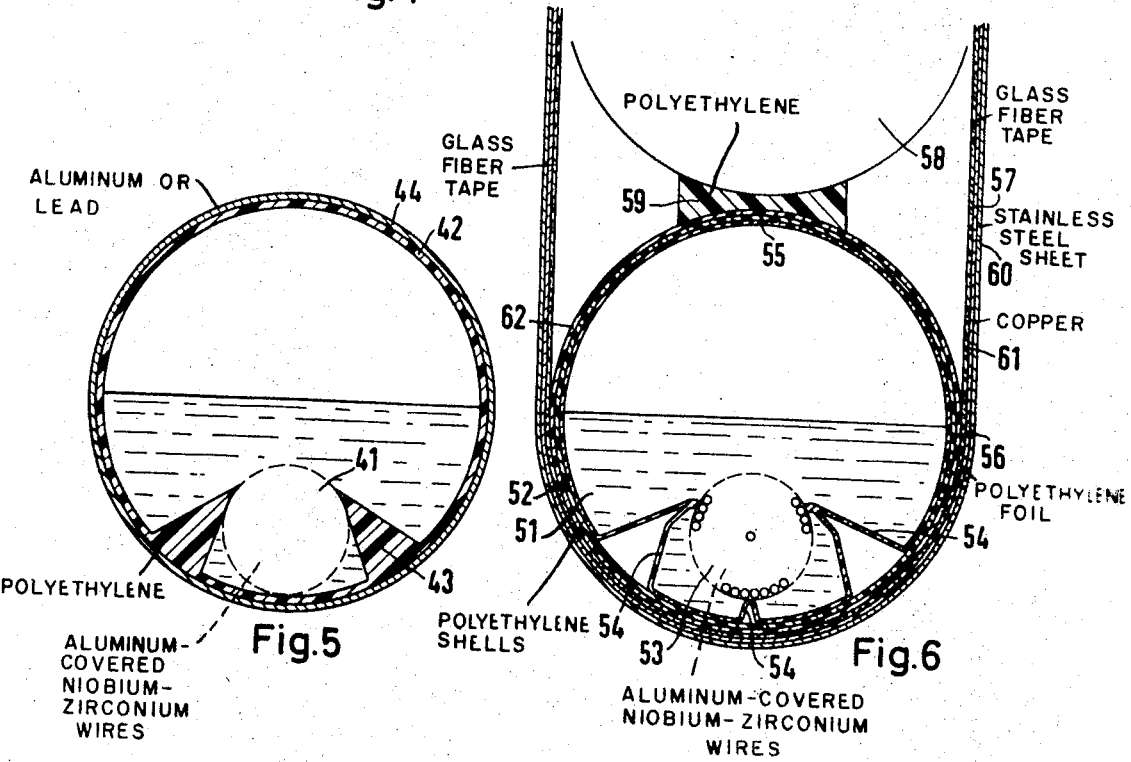

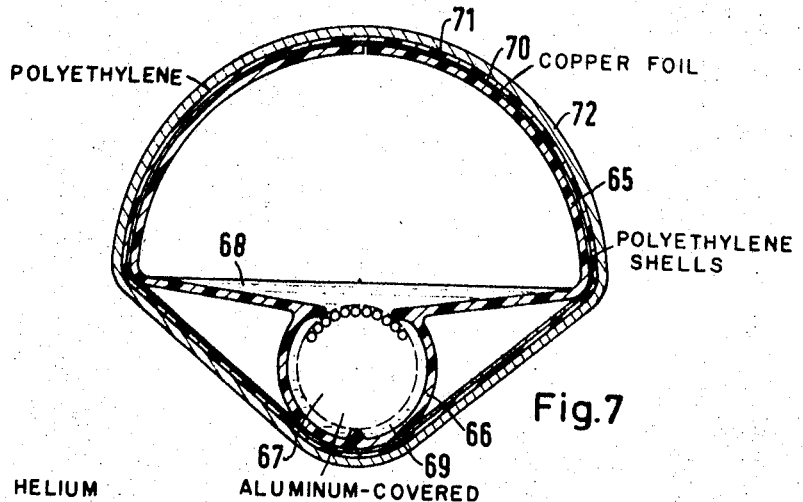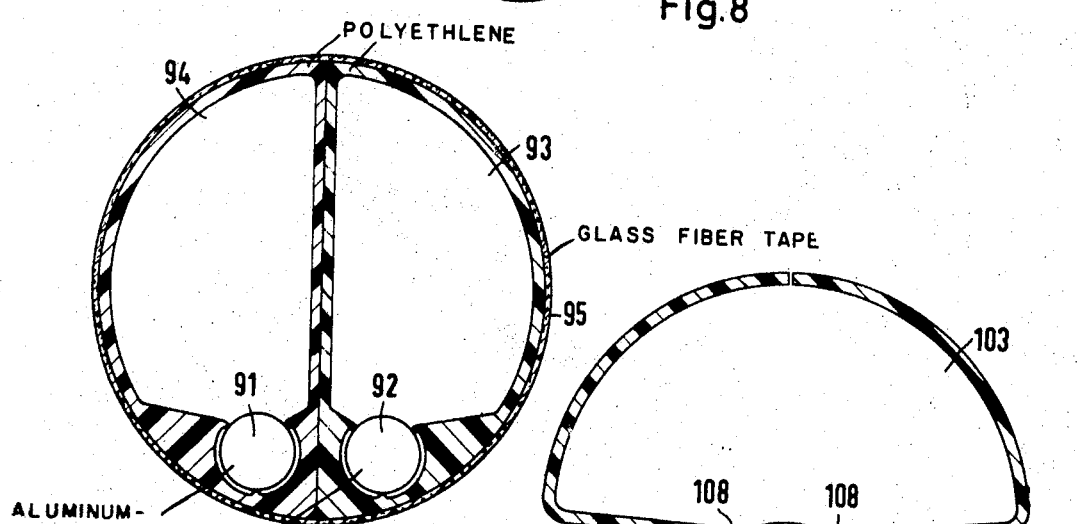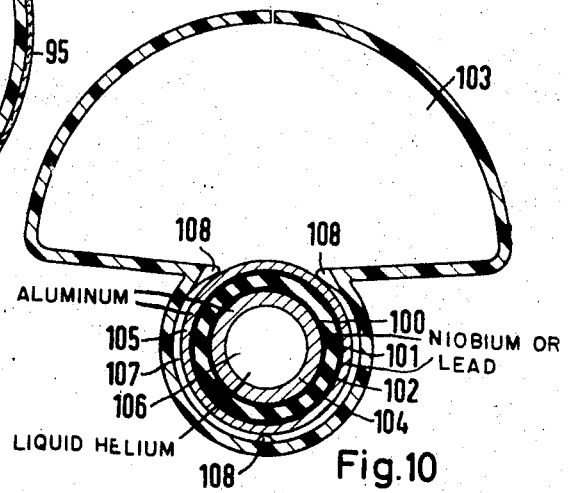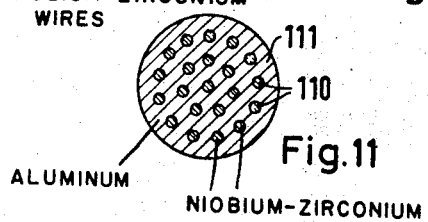

3,529,071
SUPERCONDUCTING CABLE FOR TRANS-
MITTING HIGH ELECTRICAL CURRENTS
Wilhelm Kafka, Tennenlohe, Germany, assignor to Siemens Aktiengesellschaft, a corporation of Germany
Filed Apr. 26, 1968, Ser. No. 724,537
Claims priority, application Germany, Apr. 29, 1967,
S 109,663
Int. Cl. H01b 7/34
U.S. Cl. 174—15    27 Claims

ABSTRACT OF THE DISCLOSURE

A superconducting cable designed to be capable of transmitting high electrical currents. The cable includes an electrically non-conductive refrigerant tube which has its interior partly filled with a liquid refrigerant which occupies the lowermost interior portion of this refrigerant tube. A superconductor extends along the interior of the refrigerant tube in the lowermost interior portion thereof and is at all times completely submerged within the liquid refrigerant, and a fixing means fixes the superconductor within the refrigerant tube in a manner substantially preventing any movement of the superconductor with respect to the refrigerant tube while at the same time providing for substantially unobstructed movement of vapor bubbles of the refrigerant from the superconductor outwardly through the liquid refrigerant to a space within the refrigerant tube located over the liquid refrigerant therein.

---

My invention relates to superconducting cable designed to transmit high electrical currents by means of at least one suerconductor situated within a refrigerant tube which is located within an evacuated atmosphere.

With previously known superconducting cables (see for example the publication of "E and M," the 28th annual publication, pages 275–281, and in particular page 280) there are a plurality of superconductors arranged within a refrigerant tube in such a way that they are located approximately centrally of the individual quadrants of the circular cross section of the refrigerant tube. With a cable of this latter construction it is essential that practically the entire interior cross-sectional space of the refrigerant tube be filled with a liquid refrigerating medium during operation of the cable, such a liquid refrigerating medium being conventionally liquid helium used to refrigerate the superconductors. In order to avoid with such a conventional construction a falling of the surface of the liquid refrigerant beneath the upper superconductors, it is essential to avoid as much as possible any formation of helium vapor within the refrigerant tube, so that practically pure liquid refrigerating medium is located within the refrigerant tube. These requirements result in a very high consumption of liquid refrigerant, and in particular it is essential to pump at all times a relatively large amount of the liquid helium through the refrigerant tube.

It is a primary object of my invention to provide a superconducting cable capable of utilizing the more efficient and more economical cooling which is derived from the vapor phase of the refrigerating medium.

Thus, it is an object of my invention to provide a superconducting cable which has a refrigrant tube which can accommodate in its interior liquid as well as vaporized helium beside each other in large amounts.

Also, it is an object of my invention to provied a cable which in a simple way is capable of being manufactured in long lengths and is capable of being laid out on almost any terrain.

In accordance with my invention, the superconductor is fixed in the interior lowermost portion of the refrigerant tube which is made of electrically non-conductive material, a fixing means situating the superconductor within the refrigerant tube in such a way that there can be substantially no movement of the superconductor with respect to the refrigerant tube while at the same time during operation of the cable the superconductor is fully submerged beneath the surface of the liquid refrigerant which is in the interior of the regrigerant tube. Also, the superconductor and fixing means which holds the latter in the refrigerant tube coact in such a way that the vapor bubbles of the liquid refrigerant which form at the superconductor are capable of rising into the space within the interior of the refrigerant tube over the liquid refrigerant therein.

Inasmuch as with the cable of my invention the superconductor is completely submerged within and surrounded by the liquid refrigerant, a good refrigeration of the superconductor is assured. Furthermore, since vapor bubbles of the liquid refrigerant which form at the superconductor in the case of inner losses can rise up to the space which is filled with vaporized refrigerating medium during operation of the cable, the formation of a skin of vaporized refrigerating medium along the superconductor, which would not lead to a good refrigeration thereof, and the formation of large vapor bubbles at the exterior surface of the superconductor as well as formation of an undesirable mixture of liquid and vapor refrigerating medium are avoided in the interior of the refrigerating tube. Because of the fixed connection of the superconductor to the refrigerant tube in the interior thereof, movement or loosening of the superconductor within the refrigerant tube as a result, for example, of the influence of magnetic forces is reliably avoided. Such a movement could result in localized portions of the superconductor which project above the surface of the liquid refrigerating medium. Also in the cable of my invention the refrigerant tube acts at the same time as insulation.

In the event that the superconducting cable of my invention is to be laid out along a path which is inclined, the cross section of the part of the refrigerant tube which is situated beneath and alongside the superconductor and which is filled with the liquid refrigerant is designed in such a way that even along that part of the cable which has the steepest inclination the liquid refrigerant flowing along the interior of the refrigerant tube completely covers the superconductor. This latter feature is of significance inasmuch as with a constant flow of liquid refrigerant within the cable, as a result of different inclinations thereof the liquid refrigerant will have different through-flow speeds resulting in location of the surface of the liquid refrigerant within the refrigerant tube at non-uniform elevations.

When a cable of my invention is designed for direct current operation, it is of advantage to use a superconductor made up of individual wires of high-field superconductive material embedded, for the purpose of electrical stabilization, within a metal which is of normal electrical conductivity at the operating temperature of the superconductor. For this purpose the superconductor can be made up particularly of wires of an alloy of niobium-zirconium and niobium-titanium, as well as wires having exterior surface layers of nibium-tin. The stabilizing metal can in particular be ultra pure copper or aluminum. The cross section of the stabilizing metal will in a known way be selected in such a way that the stabilizing metal can take over the current which flows in the superconducting wires in the event of a transition of the wires from the superconducting to the normal conducting state, while at the same time there is available such large exterior cooling surface that upon transition of the superconducting wire into the normal conducting state the critical temperature of the superconducting material is not exceeded. According to a preferred construction of my invention the superconducting cable has a superconductor made up of individual intertwisted superconducting wires covered with a coating of metal of normal electrical conductivity with suitable spacers being situated between these coatings or covering layers so as to maintain therebetween open spaces through which the liquid refrigerating medium can freely flow. Thus, a superconductor constructed in this way can have the liquid refrigerating medium, such as liquid helium, flow freely through the interior of the superconductor itself which is thus permeable with respect to the liquid refrigerating medium and therefore enables a particularly effective refrigeration to be achieved.

In the case where the cable is designed for very high direct currents, for example for direct currents on the order of 20 ka., grounding will not be relied upon as a return conductor, and instead there will be a pair of superconductors respectively serving as supply and return conductors and respectively situated within a pair of refrigerant tubes both of which are located within a common evacuated space.

On the other hand, where the cable of my invention is designed to operate with alternating current, it is of advantage to provide for each phase a pair of hollow cylindrical superconductors respectively acting as supply and return conductors and concentrically situated one within the other, with these conductors separated from each other by a layer of insulation and with both of these conductors situated within the refrigerant tube. Within the concentrically arranged superconductors there will then be a space for the liquid refrigerant, serving to refrigerate the interior superconductor. Superconducting materials for an alternating current cable can in particular be niobium or lead. For the purpose of stabilization, additional metal of normal conductivity can be provided.

The refrigerant tube of the cable of my invention can have different cross-sectional configurations. In one embodiment of a cable of my invention the refrigerant tubes can be of approximately circular cross section and the sueprconductors can be situated in the interior of such tubes at the lowermost interior portions thereof where these superconductors are suitably fixed. Refrigerant tubes of this type of construction are exceedingly simple to manufacture. In another embodiment of my invention, particularly suited for use along hilly terrain where the cable will be inclined, the refrigerant tube has at its lowermost portion a hollow projection extending longitudinally of the tube and accommodating the superconductor in its interior. Over this hollow projection the refrigerant tube has in cross section the configuration of a semi-circle lying on its flat side. With a further embodiment of a superconducting cable of my invention the refrigerant tube has the cross-sectional configuration of a semi-circle which rests upon a side edge thereof. Such refrigerant tubes are particularly preferred in the case where supply and return conductors of the superconducting cable are to be situated beside each other within a common evacuated space.

Also, there are various possibilities for the construction of the refrigerant tube of the cable of my invention. According to one such construction, the refrigerant tube is made of a plastic which is impermeable to the refrigerating medium, such as, for example, a suitable polyethylene mixture. In the event that in individual situations difficulties are encountered in the manufacture of a refrigerant tube of a plastic which is impermeable to the refrigerating medium, it is possible also to use refrigerating tubes of insulating plastic which is permeable to the refrigerating medium but which is provided with an outer covering of a metal of good electrical conductivity which is impermeable to the refrigerating medium, such as, for example, ultra pure lead or aluminum. In this case the metal coating will serve at the same time as a shield against the magnetic fields encountered with upper harmonic waves and the eddy current losses generated thereby. With this construction it is possible for the superconductor to be surrounded by the refrigerant tube in an extruder so that when the cable of my invention is laid out the superconductor and refrigerant tube form a prefabricated unit.

With other embodiments of the superconducting cable of my invention it may be of advantage for the purpose of shielding the outwardly situated components of the cable to surround the refrigerant tube with a metallic shield. A further construction of this type includes a refrigerant tube made up of plastic shells connected one to the next longitudinally of the cable and surrounded by a layer of metal of good normal electric conductivity such as, for example, copper or aluminum foil acting as a shield, and by a plastic insulation layer. Over the latter structure is located a metal coating which is not permeable to the refrigerating medium. This metal coating can advantageously also be made of lead or aluminum and can be manufactured by extruding.

In the case where a pair of superconductors serve as supply and return conductors and are respectively located in adjoining refrigerating tubes within a common evacuated space, it is not necessary to surround each refrigerant tube with an envelope which is vacuum-tight and tight with respect to the refrigerating medium. Instead it is sufficient to provide for both refrigerant tubes a common vacuum-tight envelope. According to a particular advantageous form of my invention, such a cable includes refrigerant tubes made up of plastic shells connected one to the next longitudinally of the cable and surrounded by a layer of plastic foil. Over the latter it is possible to situate a wrapping of tape made of glass fibers.

The fixing of the superconductor within the refrigerant tube must be carried out in such a way that the access of the refrigerating medium to the exterior surface of the superconductor is not interfered with and the refrigerant vapor bubbles which form at the superconductor have the possibility of rising into the upper inner space of the refrigerant tube. With a particularly simple form of my invention, suited especially for superconductors through the interior of which the refrigerating medium can flow, the superconductor is held within the refrigerant tube by means of rib-shaped protrusions extending along the interior of the refrigerant tube and circumferentially engaging the superconductor at a plurality of locations. These protrusions can have a relatively massive structure and can be integrally formed with and made of the same material as the wall of the refrigerant tube. In this case these protrusions can be very simply manufactured in an extrusion press simultaneously with the extrusion of the refrigerant tube itself.

However, in order to save material and to lower the dielectric losses in the protrusions, it may be of advantage to provide such protrusions in the form of hollow inwardly extending projections situated along the interior of the refrigerant tube. However, it is also possible, with another embodiment of my invention, to hold the superconductor in the interior of the refrigerant tube by means of relatively small bosses which are spaced from each other along the interior of the refrigerant tube and which engage the superconductor to fixedly hold the latter within the refrigerant tube. This construction is particularly suitable for superconductors through which the refrigerating medium cannot flow. Thus, the longitudinally extending protrusions which extend along the superconductor can be used with those superconductors which in themselves have such a construction that they do not interfere with the rising of the vapor bubbles of the refrigerating medium. Inasmuch as the relatively small bosses for holding the superconductor cannot be advantageously manufactured in an extrusion press, with this construction the wall of the refrigerant tube is advantageously made of prefabricated plastic shells connected one to the next.

In those cases where the cable of my invention has supply and return conductors situated in separate refrigerant tubes in a common evacuated space, the refrigerant tubes can advantageously be situated one above the other and held together by means of tape of a material of high mechanical strength. As a result of this connection the shifting of the refrigerant tubes as a result of the influence of magnetic forces between the supply and the return conductors is reliably avoided.

In order to shield the refrigerant tubes against heat radiation, the refrigerant tubes of the cable of my invention can advantageously be situated within a heat shield made up of lower and upper components which can be separated from each other and which are made of a metal of good thermal conductivity. The lower and upper components of the heat shield which surrounds and encloses the refrigerant tubes moreover can be provided with conduits for a second refrigerating medium which cools the heat shield. This latter refrigerating medium can, for example, be in the form of liquid nitrogen having a temperature of 77° K. The refrigerant tubes are advantageously situated in the lower portion of the heat shield where they are suspended and held by a means which includes flexible elements of poor thermal conductivity such as suitable filaments or tapes. This type of mounting and the capability of disassembling the heat shield makes the assembly of the cable very simple.

According to a further feature of my invention the evacuated atmosphere can be provided by way of an outer casing means of the superconducting cable, this casing means having lower and upper portions surrounded by an outer wall of sheet steel welded along a seam which extends longitudinally of the cable. The sheet steel outer wall serves as a vacuum-tight closure. For the purpose of favorably absorbing exterior forces, the outer casing means preferably has a circular cross section. A vacuum casing of this type which can in a simple manner be laid out and assembled at the site where the cable is to be situated can also be advantageously used with other types of cables.

The lower and upper parts of the vacuum casing can advantageously take the form of corrugated tubing of steel or a plastic tubing may be used.

The heat shield of the cable can advantageously be suspended on brackets by means of filaments or tapes of a material of poor thermal conductivity so as to be fixedly mounted in this way, such brackets being connected with the lower part of the vacuum casing.

Inasmuch as the individual components of the cable will be of different temperatures during operation and thus will have different degrees of thermal expansion and contraction, the refrigerant tubes are suspended in the heat shield and the heat shield is suspended in the vacuum casing in such a way that both the refrigerant tube and the heat shield have a slight wavy configuration. As a result of the wavy configuration of these components, they are capable of contracting during cooling without creating undesirable mechanical stresses between the components.

My invention is illustrated by way of example in the accompanying drawings which form part of this application and in which:

FIG. 2 is a fragmentary perspective illustration of a superconducting wire of the superconductor of the cable of FIG. 1;

FIG. 3 is a fragmentary transverse sectional elevation of a refrigerant tube of the cable of FIG. 1;

FIG. 4 is a schematic representation of the manner in which the cable of my invention is laid out, this layout being shown as viewed from above;

Figure 1:
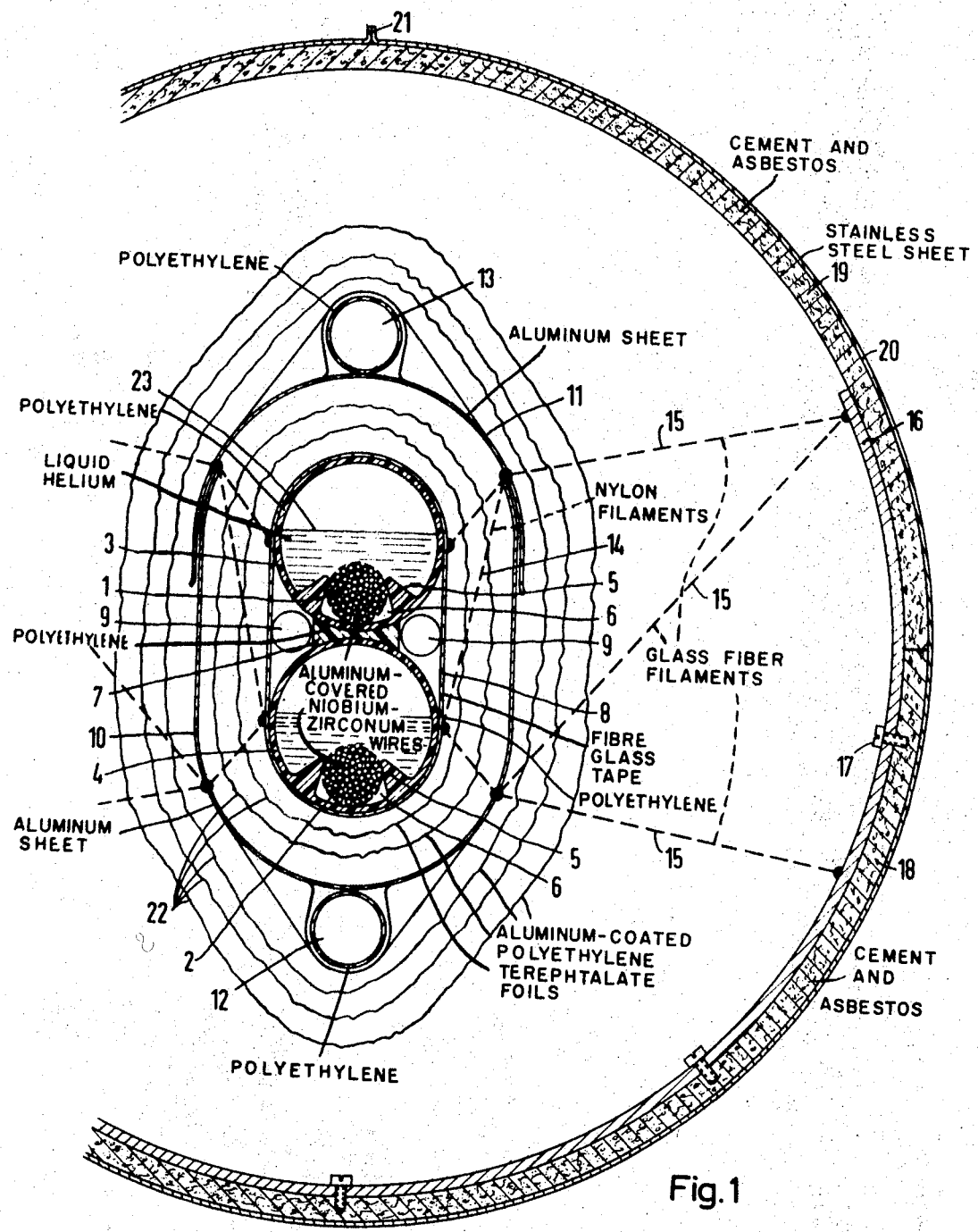
FIG. 1 is a fragmentary transverse sectional elevation of one possible embodiment of a cable of my invention.

FIGS. 5–7 respectively illustrate in transverse sectional elevations different embodiments of refrigerant tubes of the cable of my invention;

FIG. 8 schematically shows in a fragmentary longitudinal section a refrigerant tube of a cable of my invention laid out along hilly terrain where the cable will have different inclinations;

FIG. 9 is a transverse sectional elevation of refrigerant tubes of another embodiment of a cable of my invention which is provided with supply and return conductors;

FIG. 10 is a transverse sectional elevation of a superconductor and refrigerant tube of an alternating current cable of my invention; and FIG. 11 is a transverse sectional illustration of an embodiment of a superconductor to be used in a D.C. cable of my invention.

The direct current cable of my invention which is illustrated in FIG. 1 includes a superconductive supply conductor 1 and a superconductive return conductor 2, these conductors respectively being fixed within refrigerant tubes 3 and 4. The refrigerant tubes 3 and 4 are made of an insulating plastic such as, for example, a suitable mixture of polyethylene which is impermeable to helium. These tubes 3 and 4 have an approximately circular cross section and a diameter which is substantially greater than the diameter of the superconductors, so that within each of the tubes 3 and 4 there will be a sufficient free space to accommodate the liquid and gaseous helium which flows through the cable.

A fixing means is provided for fixing the superconductors within the refrigerant tubes, and in the illustrated example the superconductors 1 and 2 are circumferentially engaged at a plurality of locations by elongated, rib-shaped, relatively massive protrusions 5 which extend along the interior of the refrigerant tubes and which are integrally formed with the walls thereof, these protrusions 5 thus forming the fixing means for maintaining the superconductors 1 and 2 against movement in and with respect to the refrigerant tubes 3 and 4. Between the protrusions 5 and each superconductor there are a pair of free spaces 6, so that the liquid helium can have free access to all parts of the superconductor which thus can be completely submerged within the liquid helium. The superconductors 1 and 2 are made up of a number of intertwisted superconducting wires of high-field superconducting material coated with a covering of metal which is of normal electrical conductivity. By way of suitable spacer structures situated between these wires the latter are maintained apart from each other to provide for free flow of the helium throughout the entire interior of the superconductor all around the individual wires thereof.

FIG. 2 illustrates one of the individual superconducting wires of the superconductors 1 and 2. The inner superconducting core 30 made, for example, of niobium-zirconium or niobium-titanium is surrounded by and embedded within a stabilizing layer 31 of ultra-pure aluminum. The spacer structure is formed by nylon or glass filaments 32 which are wound around the superconducting wire in the manner shown in FIG. 2. In order to manufacture the superconductors 1 and 2 a multiplicity of such wires are wound around each other in different layers.

The refrigerant tubes 3 and 4 in the structure of FIG. 1 are situated one over the other with a plastic padding layer 7 interposed therebetween. The refrigerant tubes 3 and 4 are held together by a binding 8 made of a mechanically strong glass fiber tape.

The refrigerant tubes 3 and 4 are surrounded by a heat shield which can be disassembled and which is composed of a lower part 10 of U-shaped cross section and an upper part 11 which is also of U-shaped cross section and which overlaps the lower part 10. These lower and upper components of the heat shield are provided with conduits 12 and 13 for liquid nitrogen.

In order to suspend the refrigerant tubes 3 and 4 in the lower part 10 of the heat shield nylon filaments 14 are used. The lower part 10 of the heat shield is itself suspended by means of glass fiber filaments 15 connected to an arcuate holding bracket 16 which, for example, is fixed by screws 17 to the lower part 18 of a vacuum-tight casing means, this part 18 having a semi-circular cross section.

At the location where the upper part 11 of the heat shield is joined to the lower part 10 thereof, this upper part is formed with suitable notches or slots so that the upper part of the heat shield can without difficulty be mounted upon the lower part thereof after fixing of the lower part 10 in its final position by way of the suspension on the bracket 16. The upper part 19 of the outer vacuum casing means is also of semi-circular cross section and is situated directly on the lower part 18 thereof. Both of these components of the outer casing means can be made of a plastic tubing material, for example a material known under the trade name "Eternit" and formed of cement and long-fiber asbestos. To achieve a vacuum-tight seal for the outer casing means which thus maintains the inner structure in an evacuated space, a stainless steel sheet 20 surrounds the components 18 and 19 and has its adjoining side edges welded together along a seam 21 which extends longitudinally of the cable.

Around the refrigerant tubes and also around the heat shield there are crumpled, aluminum-coated polyethylene-tetrephtalate foils 22. These foils are known under the trade name "Superisolation." The liquid helium within the refrigerant tubes has the illustrated surface 23. Above this surface of the liquid helium there is during operation of the cable gaseous helium. Helium vapor bubbles which form at the exterior surface of the superconductors 1 and 2 can rise practically without any hindrance directly through the interior of the superconductor, due to the spacing between the individual wires thereof, into the upper portion of the refrigerant tube.

As is shown in FIG. 3, each refrigerant tube 3 and 4 can be provided at its exterior surface with a grounded layer 35 of a semiconductive lacquer. This construction serves to avoid non-uniform charging of the exterior surface of the refrigerant tubes. In order to absorb interior excess pressure it is also possible to surround each refrigerant tube with a reinforcing layer 36 which is made, for example, of resin-impregnated glass fiber tapes.

As a result of the features of the construction of the cable described above the layout of the cable is relatively simple. The superconductors 1 and 2 can, for example, be surrounded by the refrigerant tubes 3 and 4 in an extrusion press. They will be fixedly mounted within the extruded tubes 3 and 4 by the simultaneous extrusion of the rib-shaped protrusions 5. The refrigerant tubes which thus are manufactured with the superconductors therein can then be wound into a suitable spool or roll, and can be transported in this condition to the site where the cable is to be laid out. At this site the sheet steel outer wall 20 which initially is of U-shaped cross section is set into the cable trench. Then the lower part 18 of the outer vacuum casing means is placed within the sheet 20. The connections of the ends of the longitudinal sections which butt against each other can be brought about, for example, by suitable splicing straps which bridge the adjoining ends of the sections and are fixed thereto. The nitrogen tubes 12 and 13 can also be transported in suitable spools to the site where the cable is to be laid out. They are connected outside of the cable trench to the lower part 10 and upper part 11 of the heat shield. Then the lower part 10 of the heat shield is suspended on the brackets 16 which are fixed in the outer casing means component 18 at suitably spaced locations therealong. Then the refrigerant tubes 3 and 4 are taken from their rolls and located one over the other, in which position they are connected to each other by way of the binding 8. Of course, before the tubes 3 and 4 are assembled together by way of the binding 8, the intermediate pad 7 is situated therebetween, and in the free spaces between the pair of refrigerant tubes 3 and 4 signal-transmitting cables 9 can be situated. This assembly is then suspended in the lower part 10 of the heat shield. After the crumpled Superisolation is placed around the assembly within the lower part of the heat shield, the upper part 11 thereof is mounted on the lower part 10. Then the heat shield itself is surrounded by the Superisolation and the upper component 19 of the outer casing means is set upon the lower component 18 thereof. Finally the sheet 20 is pulled tightly around the tube formed by the components 18 and 19 and is welded in a vacuum-tight manner along the seam 21. Where the cable is required to extend along curves the sheet 20 can be provided with transverse seams or can be preliminarily folded in a suitable manner.

In order to make it possible to compensate for the mechanical stresses which are encountered during the refrigeration, the lower part 10 of the heat shield is mounted on the holding brackets 16 carried by the lower part 18 of the outer casing means in such a way, as shown in FIG. 4, that the heat shield extends along a slightly wavy path in the interior of the outer vacuum-tight casing. Also, the refrigerant tubes 3 and 4 are held within the lower part 10 of the heat shield by way of the filaments 14 in such a way that these refrigerant tubes extend along slightly wavy paths, inasmuch as the super-conductors in the interior of the refrigerant tubes are, during operation of the cable at substantially lower temperatures than the heat shield. The curves of the wavy paths along which the refrigerant tubes extend are smaller than those along which the heat shield extends. The extent of departure from the central axis of the cable is illustrated at a highly enlarged scale in FIG. 4. In the actual construction of a special embodiment of the cable of my invention, the suspension locations of the heat shield at the outer vacuum-tight casing are spaced from each other by four meters, while the maximum lateral deviation of the heat shield from the central axis is on the order of approximately 15 cm.

An embodiment of my invention constructed according to FIG. 1 as a direct current cable has been designed for a rated current intensity of 20 ka. and for a voltage of 100 kv. between a supply conductor 1 and a return condutcor 2. The supply and return conductors of this construction each includes 127 superconducting niobium-zirconium wires 30 each of which has a diameter of .025 mm. Each wire 30 is encased within the outer covering 31 of aluminum of 99.99 percent purity with the outer covering 30 having a thickness of approximately 0.5 mm. all around the superconducting wire 30. Along each of these individual wires, which is to say around the outer covering 31 thereof, a nylon filament 32 of 0.2 mm. thickness is wound in the manner shown in FIG. 2. The 127 individual wires of each superconductor are twisted into a rope of circular cross section in seven layers which are oppositely twisted one with respect to the next. The ropes which have this construction thus form the supply and return conductors 1 and 2. The exterior diameter of the rope is on the order of 23 mm. When the refrigerating machines, which supply the cable with helium, are spaced from each other by a distance of approximatley 100 km. each of the refrigerant tubes 3 and 4 is required to have in its interior a clear cross-sectional space or free area of approximately 27 cm.$^2$. Taking into consideration the cross-sectional area of the superconductor within each refrigerant tube and the cross-sectional space occupied by the protrusions 5, each refrigerant tube is constructed so as to have an inner diameter of approximately 6.5 cm. The polyethylene tubes 3 and 4 each have a wall thickness of approximately 2 mm. and are dimensioned in such a way that they withstand a potential of 50 kv. with respect to ground. The glass fiber armor or reinforcing layer 36 (FIG. 3) has a wall thickness of approximately 0.1 mm. The heat shield 10, 11 is made of thin aluminum sheet, has a width of approximately 14 cm. and has height of approximately 20 cm. Between the heat shield and the refrigerant tubes approximately 45 foil layers of the Superisolation foil are provided. Between the heat shield and the outer vacuum-tight casing means there are an additional approximately 60 layers of the Superisolation foil. The outer casing means which maintains the inner evacuated atmosphere for the cable of my invention has an inner diameter of approximately 45 cm. Within the outer casing means, by way of a suitable vacuum pump installation which communicates with the interior thereof, there is maintained with this particular construction at leas a vacuum of less than $10^{-4}$ torr. The refrigerant tubes 3 and 4 are supported at locations spaced from each other by one meter by way of six nylon filaments 14 each of which has a cross-sectional area of approximately 0.2 mm.², these filaments providing a support for the refrigerant tubes on the lower part 10 of the heat shield in the manner described above. The lower part of the heat shield is itself suspended at locations spaced from each other by four meters by way of six glass fiber filaments each of which has a cross section of approximately 0.3 mm.², and these filaments are carried by the arcuate brackets 16 which thus are also spaced from each other by a distance of four meters along the lower part 18 of the outer casing means. The nitrogen conduits 12 and 13 each have a diameter of approximately 3 cm. The rate of helium throughflow through the cable of my invention is selected so that the superconductors 1 and 2 are at all times covered with liquid helium.

FIG. 5 illustrates an embodiment of a refrigerant tube of my invention where the vacuum sealing and the electrical insulation are separate from each other. The superconductor 41 is surrounded by the insulating plastic tube 42 preferably by way of an extrusion process, as described above, and the superconductor is held within the tube 42 by the elongated rib-shaped plastic protrusions 43 which are extruded simultaneously with the tube 42 directly into engagement with the superconductor 41. The plastic refrigerant tube 42 is surrounded and engaged by a vacuum-tight metal coating 44 which preferably consists of ultrapure aluminum or lead and which also can be manufactured in an extrusion press. This embodiment of my invention has the particular advantage of achieving by way of the electrically conductive exterior coating 44 of good electrical conductivity a screening of the remainder of the cable against eddy current losses which can be encountered when there are upper harmonics in the direct current cable. As has already been indicated in FIG. 3, it is possible also with the embodiment of FIG. 5 to surround the structure illustrated therein with a reinforcing armoring layer of glass fibers surrounding and engaging the metal coating 44.

With the embodiment of my invention which is illustrated in FIG. 6, the refrigerant tube 51 is composed of a series of elongated plastic shells 52 distributed longitudinally along the cable and connected one to the next to provide in this way a continuous refrigerant tube. The superconductor 53 of this embodiment is held within the refrigerant tube 51 so that it cannot move with respect thereto by way of a fixing means which in this case is composed of the elongated rib-shaped protrusions 54 taking the form of integral inwardly bulging or extending portions of the wall of the refrigerant tube 51. The shell which forms the refrigerant tube 51 is curved to the cross-sectional configuration shown in FIG. 6 so that it has the free side edges of the shells situated closely adjacent to each other at the region 55 indicated in FIG. 6. Thus, the superconductor is placed within the shell 52 and the latter is curved around the superconductor to form the construction shown in FIG. 6. In order to thicken and thus strengthen the insulation, the plastic shells 52 are situated within a layer 56 of plastic insulating foil which is wrapped around the shells 52. The refrigerant tube 51, which in FIG. 6 may accommodate the supply conductor in its interior, is interconnected with an identically constructed refrigerant tube 58 for the return conductor by way of a wrapping 57 made of a tape of glass fibers. Between the pair of rerigerant tubes is situated a spacer pad 59 made of plastic and having upper and lower concave surfaces of the same curvature as the exterior of the refrigerant tubes. It is to be noted that in the condition as thus far described the refrigerant tubes 51 and 58 are still not vacuum-tight or impermeable to the refrigerating medium. Therefore, they are housed within a common vacuum-tight envelope of stainless steel 60 made of a stainless steel sheet metal which has its opposed side edges welded to each other in a vacuum-tight manner along the seam which extends longitudinally of the cable. The steel sheet 60 moreover has at its inner surface a copper layer 61 which acts as a shield. Moreover, each of the refrigerant tubes 51 and 58 is surrounded by a reinforcing or armoring layer 62 formed from a glass fiber tape.

The construction of my invention which is illustrated in FIG. 7 is particularly suitable because of its special cross-sectional configuration for cable lines which have portions which are steeply inclined. This embodiment is constructed of a plurality of plastic shells 65 which are distributed along the cable and joined one to the next so as to provide a continuous refrigerant tube. At their lowermost portions the shells 65 are provided with elongated hollow protrusions 66 bulging downwardly from the remainder of the shell and serving to accommodate the superconductor 67. The part of the refrigerant tube which is situated over its lower elongated hollow protrusion 66 has in cross section substantially the configuration of a semi-circle which rests on its flat side. The upper surface 68 of the liquid helium is capable of sinking in a refrigerant tube of this construction to a much greater extent than in a refrigerant tube of circular cross section without any possibility of situating any part of the superconductor 67 above the upper surface of the liquid helium. A gap 69 of arcuate cross section is situated between the superconductor 67 and the elongated hollow lower protuberance 66 so as to assure a complete engagement between all parts of the superconductor, throughout the interior as well as the exterior thereof with the liquid refrigerating medium. In order to provide a shield, the plastic shell 65 which, for example may be made of polyethylene, are wrapped within a layer of copper foil 70. Over this latter copper foil layer 70 is an insulating layer 71 of plastic foil. An extruded tubular casing 72 of aluminum or lead forms an envelope for the structure of FIG. 7 and provides a vacuum-tight closure. It is also possible to alternate the copper foil 70 and the plastic foil 71 in series one after the other.

The fact that it is possible for the surface of the liquid helium to rise and fall within the refrigerant tube of a cable line which is laid out in hilly terrain so that it has different inclinations is schematically illustrated in FIG. 8. In the illustration of FIG. 8 it is assumed that the liquid helium 81 and the gaseous helium 82 are completely separate from each other and that the gas and liquid flow through the interior of the refrigerant tube 83 in the direction of the arrows from left to right. Thus, the liquid helium 81 will have an upper surface 84. Along a downwardly inclined part of the cable the liquid helium flows at a constantly increasing rate as a result of gravity, so that the surface of the liquid sinks. On the other hand, where the cable has an uphill portion, the speed of flow of the stream of liquid helium drops also as a result of the force of gravity acting on the helium. Therefore, the surface of the liquid helium rises sharply in the refrigerant tube 83 at an uphill portion thereof. Thus, where a cable of my invention is to be laid out in terrain requiring the cable to follow a path as shown, for example, in FIG. 8, the spaces beneath and beside the superconductor through which the liquid helium flows are made so narrow that even at the most steeply inclined part of the cable the surface of the liquid helium will not sink to the elevation of the uppermost part of the superconductor which is thus situated at all times beneath the surface of the liquid helium.

FIG. 9 shows an embodiment of my invention according to which the refrigerant tubes form part of a direct current cable having a superconducting supply conductor 91 and a superconducting return conductor 92 situated beside each other. The refrigerant tubes 93 and 94, which may be made of an insulating plastic, for example, each have a cross section approximating that of a semi-circle which rests on a side edge thereof. The superconductors 91 and 92 are situated at the lowermost interior portion of the refrigerant tubes where they are held by suitable rib-shaped protrusions. By way of a common envelope 95 of glass-fiber tape the tubes 93 and 94 are mechanically held together.

The embodiment of my invention which is illustrated in FIG. 10 is designed for an alternating current cable. In this case a pair of hollow superconductors 100 and 101 of cylindrical cross section, which may be made, for example, of niobium or lead and which form supply and return conductors, are concentrically arranged one within the other and are maintained separate from each other by way of intermediate insulating layer 102, this assembly 100–102 being situated in the lowermost interior portion of the refrigerant tube 103 which essentially conforms to the construction described above and shown in FIG. 7. In order to stabilize the superconductors there are additional concentric aluminum layers 104 and 105. The hollow interior space 106 situated within the tubular conductor structure has liquid helium therethrough. Inasmuch as the tubular conductors of this construction cannot have the helium flowing throughout the interior structure thereof, this construction is not provided with elongated rib-shaped holding protrusions, since such a construction would in this case prevent the rising of helium vapor bubbles forming in the outer space 107 into the upper part of the refrigerant tube 103. Instead, with this construction relatively small bosses 108 of substantially pointed configuration are integrally connected with and project inwardly from the wall of the refrigerant tube, at its lower hollow protrusion which accommodates the super conductor structure, and it is these spaced bosses 108 which form the fixing means engaging and holding the superconductor so that it will not move with respect to the refrigerant tube. Inasmuch as these bosses 108 are distributed longitudinally along the refrigerant tube and have only a substantially point contact with the superconductor structure, it is possible for the helium vapor bubbles to rise without any hindrance from the passage 107 of arcuate cross section which extends around the superconductor structure and in which the liquid helium is located.

It is also possible with a direct current cable to provide a fixing means made up of bosses such as the bosses 108. Such a construction will be used in this case when the construction of the superconductor is such that the refrigerant cannot flow throughout the interior thereof. Thus, if the superconductor of a direct current cable has a construction such as that shown in FIG. 11, a holding of fixing means formed by bosses 108 will be used. In FIG. 11 the superconductor is made up of a multiplicity of individual superconducting wires 110 which are surrounded by and embedded within a compact aluminum body 111 which is extruded directly around the superconductors, for example.

In the case of a cable which operates with alternating current, it is possible to use, instead of superconductors 100 and 101 of hollow cylindrical cross section a multiplicity of superconducting wires which are distributed about a given axis parallel to the wires so that the latter may be considered as being distributed along a cylindrical surface. In the case of a three-phase cable, the conductors for all three phases can be situated within a single refrigerant tube. For each phase a concentric supply and return conductors are provided.

The superconducting cable of my invention has many advantages over known superconducting cables which have cooling by way of a liquid refrigerant. The vapor cooling used with the cable of my invention can thus make use of the large heat of vaporization of helium at 4.2° K., this heat of vaporization being approximately twice as great as the enthalpy difference of liquid helium between 4.2 and 5° K. Therefore, when using the same amount of helium as in conventional structures, it is possible with the vaporized cooling of the cable of my invention to convey more heat away than is possible with liquid cooling. Thus, with vapor cooling, as opposed to liquid cooling, it is possible with the same refrigerating power to reduce the amount of refrigerant through-flow and the required pressure within the refrigerant tube. Moreover, it is also possible to reduce the cross-sectional size of the refrigerant tube, so that in this way an important advantage is achieved in connection with the transporting and laying out of the cable of my invention.

I claim:

1. In a superconducting cable assembly for transmitting high electrical currents, at least one electrically non-conductive refrigerant tube and a superconductor extending along the interior of said refrigerant tube and occupying the lowermost interior portion thereof, and means situated in said refrigerant tube and coacting with said refrigerant tube and superconductor for preventing any appreciable movement of said superconductor with respect to said tube while providing a free substantially unobstructed movement of vaporized liquid refrigerant bubbles upwardly through a liquid refrigerant in which said superconductor is completely submerged during operation so that said bubbles can rise freely to an interior upper portion of said refrigerant tube located over the surface of the liquid refrigerant in which said superconductor is submerged.

2. The combination of claim 1 and wherein said refrigerant tube has beneath and alongside of said superconductor a cross-sectional configuration which maintains the lower interior portion of said refrigerant tube filled at all times with liquid refrigerant in which said superconductor is completely submerged even at portions of the cable which are most sharply inclined along hilly terrain.

3. The combination of claim 1 and wherein the cable is designed for direct current operation, said superconductor being composed of a plurality of wires of high-field superconductive material embedded individually within a metal which is normally conducting at the operating temperature of the superconductor, in order to achieve electrically stabilization.

4. The combination of claim 3 and wherein the superconductor is composed of individual intertwisted superconducting wires covered with a layer of normal electrical conductivity, and said superconductor including between said covering layers spacers which maintain said layers apart from each other to provide a free path of flow for the liquid refrigerant.

5. The combination of claim 2 and wherein for the purpose of direct current operation there are a pair of superconductors acting as supply and return conductors, and a pair of said electrically non-conductive refrigerant tubes respectively accommodating said superconductors in said interior lower portions of said tubes in which said superconductors are respectively fixed by said fixing means, and outer casing means surrounding said refrigerant tubes for maintaining the latter in an evacuated atmosphere within said outer casing means.

6. The combination of claim 2 and wherein, for alternating current operation, each phase has a pair of supply and return conductors in the form of hollow cylindrical superconductors concentrically situated one within the other and separated by a layer of insulation, with the concentric superconductors situated within said lower interior portion of said refrigerant tube, the interior of the inner one of the concentrically arranged hollow cylindrical superconductors forming a path of flow for the liquid refrigerant.

7. The combination of claim 1 and wherein said refrigerant tube is of a circular cross section and accommodates said superconductor at the lowermost interior portion of the circular cross-sectional interior space.

8. The combination of claim 1 and wherein said refrigerant tube has at its lowermost portion a longitudinally extending hollow projection in which said superconductor is situated.

9. The combination of claim 8 and wherein the part of said refrigerant tube which is situated over said lowermost hollow projection thereof has substantially the cross-sectional configuration of a semi-circle which rests on its flat side.

10. The combination of claim 5 and wherein said pair of refrigerant tubes respectively have the cross-sectional configuration of a pair of semi-circles resting on elongated side edges thereof.

11. The combination of claim 1 and wherein said refrigerant tube is made of a plastic which is impermeable to the refrigerating medium.

12. The combination of claim 1 and wherein said refrigerant tube has a metallic shield.

13. The combination of claim 12 and wherein the refrigerant tube is made of an electrically non-conductive plastic and is covered by a coating of a metal of good electrical conductivity which is impermeable to the refrigerating medium.

14. The combination of claim 12 and wherein said refrigerant tube is composed of a plurality of plastic shells connected one to the next along the length of the cable, and said shells being surrounded by a layer of a metal of good electrical conductivity and a layer of insulating plastic, and a metal coating surrounding said layers of metal and plastic, said coating being impermeable with respect to the cooling medium.

15. The combination of claim 5 and wherein each of said refrigerant tubes is composed of a plurality of plastic shels connected one to the next along the length of the cable, said shells being surrounded by a layer of plastic foil, and a vacuum-tight envelope enclosing and being common to both of said refrigerant tubes.

16. The combination of claim 11 and wherein said fixing means includes elongated rib-shaped protrusions extending along the interior of said refrigerant tube and engaging said superconductor at a plurality of locations circumferentially distributed about said superconductor.

17. The combination of claim 16 and wherein said protrusions are relatively massive and are made of the same material as said refrigerant tube, said protrusions being integral with said refrigerant tube.

18. The combination of claim 16 and wherein said protrusions are formed from inwardly bulging projections of the wall of said refrigerant tube.

19. The combination of claim 14 and wherein said fixing means includes a plurality of relatively small projections at the inner surface of said refrigerant tube spaced from each other and engaging and holding said superconductor.

20. The combination of claim 5 and wherein said refrigerant tubes for the supply and return conductors are situated one over the other, and tape means of mechanically strong material coacting with said refrigerant tubes for holding them together.

21. The combination of claim 1 and wherein a heat shield means surrounds said refrigerant tube and is made up of lower and upper elongated portions which are removably connected to each other.

22. The combination of claim 21 and wherein said lower and upper portions of said heat shield respectively carry conduits for a second refrigerating medium for refrigerating the heat shield.

23. The combination of claim 21 and wherein a positioning means positions said refrigerant tube in the interior of the lower portion of said heat shield, said positioning means including elongated flexible members of poor heat conductivity suspending said refrigerant tube in said lower portion of said shield and fixedly holding said tube therein.

24. The combination of claim 1 and wherein an outer casing means surrounds and is spaced from said refrigerant tube for maintaining the latter within an evacuated atmosphere, said outer casing means including upper and lower portions coacting to define the evacuated space in which said refrigerant tube is accommodated and said casing means including a steel sheet surrounding said upper and lower portions of said casing and having a welded seam extending longitudinally of the cable.

25. The combination of claim 24 and wherein said outer casing means has a circular cross section.

26. The combination of claim 24 and wherein a heat shield surrounds said refrigerant tube in the interior of said outer casing means, and a plurality of elongated flexible members of poor thermal conductivity suspending said heat shield in said outer casing means and fixing said heat shield therein.

27. The combination of claim 26 and wherein said refrigerant tube has a slightly wavy configuration in the interior of said heat shield and wherein said heat shield has a wavy configuration in the interior of said outer casing means.

References Cited

UNITED STATES PATENTS

| 3,431,347 | 3/1969 | Kafka et al. | 174—15 |
| 3,390,357 | 6/1968 | Thomson | 174—15 X |
| 3,343,035 | 9/1967 | Garwin | 317—13 |
| 3,428,742 | 2/1969 | Smith | 174—99 X |

FOREIGN PATENTS

| 1,519,958 | 4/1968 | France. |
| 1,485,455 | 5/1967 | France. |

LEWIS H. MYERS, Primary Examiner

A. T. GRIMLEY, Assistant Examiner

U.S. Cl. X.R.

174—13, 29, 37, 99, 110, 126